A. DAVIS.
AUTOMOBILE REAR SIGNAL.
APPLICATION FILED JAN. 13, 1920.
1,402,576.
Patented Jan. 3, 1922.
2 SHEETS—SHEET 1.
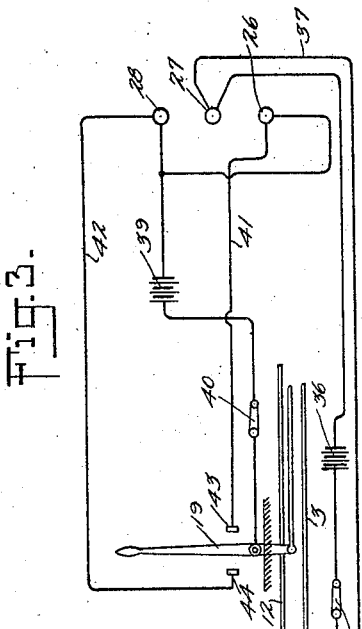
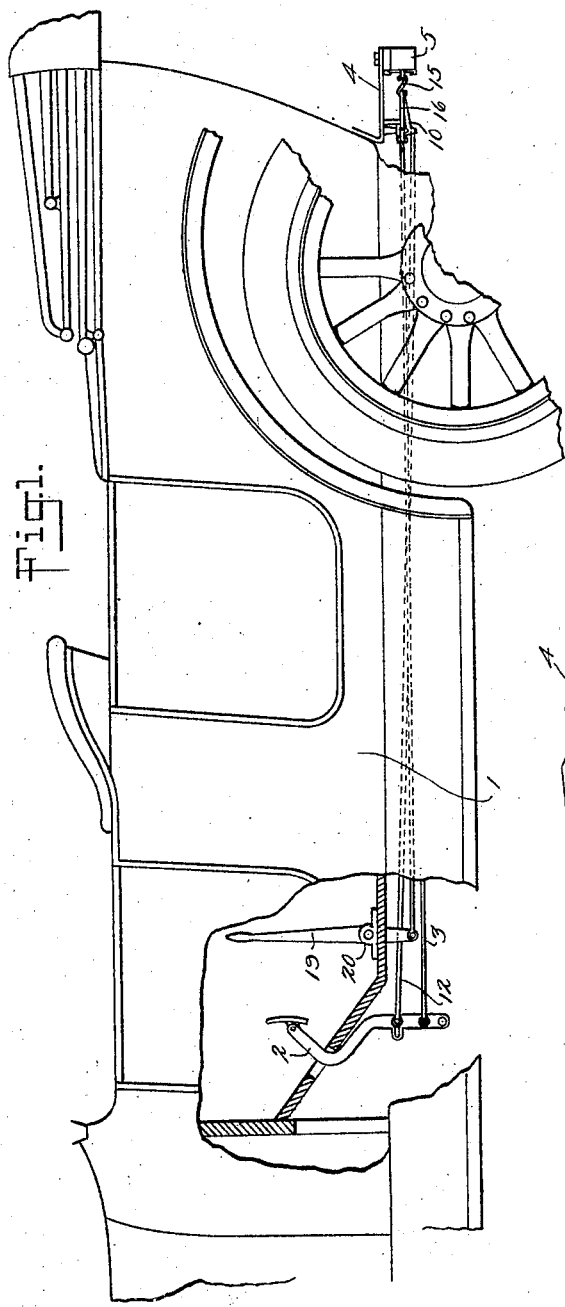
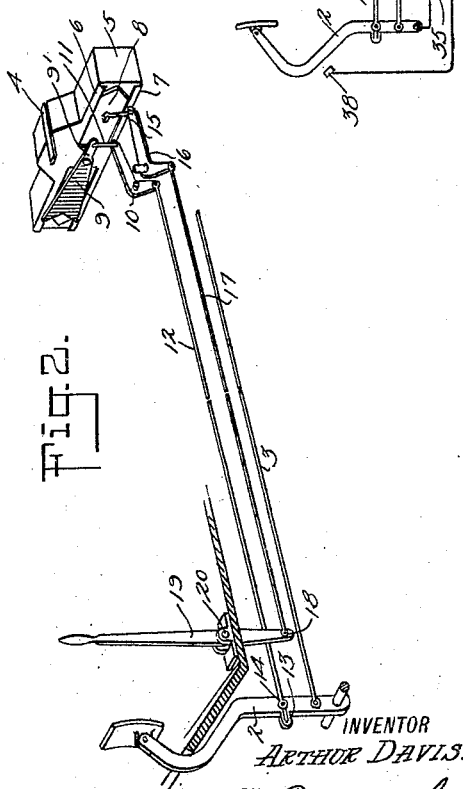
WITNESSES
William P. Goebel.
A. L. Kitchin.
INVENTOR
Arthur Davis.
BY
Munn & Co.
ATTORNEYS

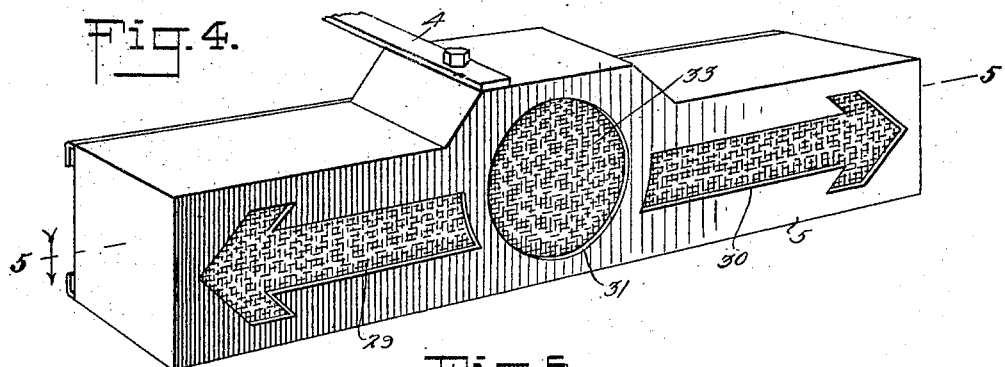
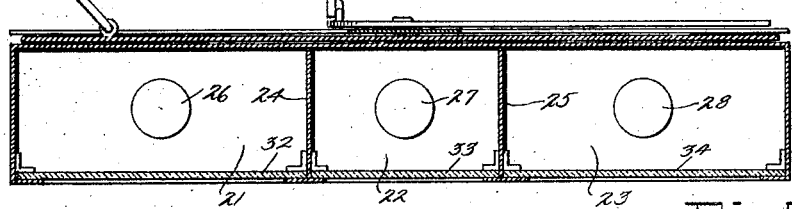
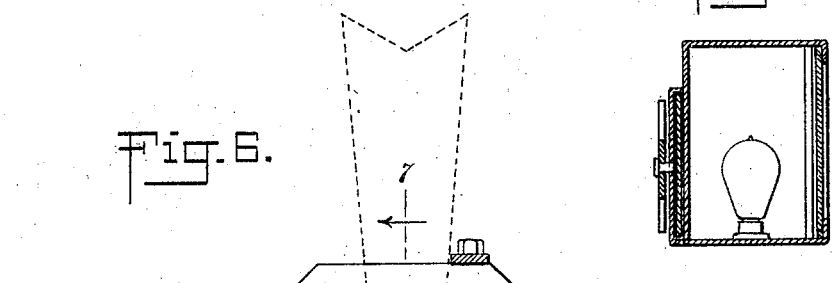
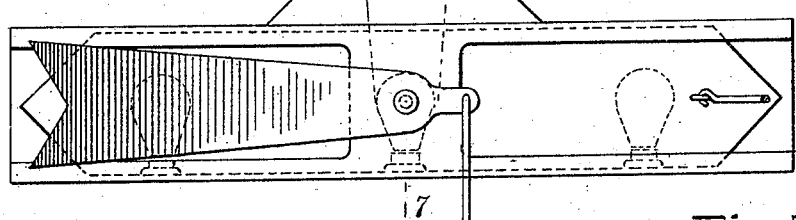
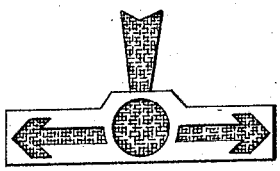
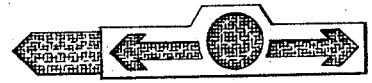

UNITED STATES PATENT OFFICE.

ARTHUR DAVIS, OF RUTHERFORD, NEW JERSEY.

AUTOMOBILE REAR SIGNAL.

1,402,576. Specification of Letters Patent. Patented Jan. 3, 1922.

Application filed January 13, 1920. Serial No. 351,219.

*To all whom it may concern:*

Be it known that I, ARTHUR DAVIS, a citizen of the United States, and a resident of Rutherford, in the county of Bergen and State of New Jersey, have invented a new and useful Automobile Rear Signal, of which the following is a full, clear, and exact description.

This invention relates to automobile rear signals and has for an object to provide an improved construction wherein proper signals will be at all times provided and connected to the front part of the automobile in such a way that the driver may shift the signals to indicate different conditions at any time.

Another object of the invention is to provide a signal for the rear of automobiles and operating mechanism therefor which is operable independently of the automobile mechanism but co-acts therewith for indicating the turning to the right or left of the automobile.

A still further object of the invention is to provide a device which is operable from the front of the automobile, but which is seen from the rear, wherein both day and night signals are used and operated by the same mechanism.

In the accompanying drawings:

Figure 1 is a fragmentary side view of an automobile disclosing an embodiment of the invention as applied thereto.

Figure 2 is a fragmentary perspective view showing the front and rear connections of certain parts of the signal device.

Figure 3 is a diagram showing part of the mechanical operating members at the front of the automobile and illustrating the electrical connections used in connection with the signal lights.

Figure 4 is a perspective view on an enlarged scale of the signal box arranged at the rear of the automobile.

Figure 5 is a sectional view through Figure 4 on line 5—5.

Figure 6 is a rear view of the box shown in Figure 4.

Figure 7 is a transverse sectional view through Figure 6 on line 7—7.

Figure 8 is a rear view on a reduced scale of the box shown in Figure 4, one of the signal arms being shown in an outer position.

Figure 9 is a view similar to Figure 8, but showing the opposite signal arm in an outer position.

Figure 10 is a view similar to Figure 8 except the central or stop arm is in its operated position.

Referring to the accompanying drawings by numerals, 1 indicates an ordinary automobile which is provided with the usual brake lever 2 positioned to operate the brake rod 3 in the usual manner. At the rear of the automobile a bracket 4 is secured to the body of the automobile in any desired manner, said bracket carrying a box or casing 5, hereinafter fully described. The box 5 is provided with slideways 6 and 7 (Figure 2) in which a sliding hand or pointer 8 is positioned, said sliding hand or pointer being of substantially the full length of the box 5 and arranged to slide beyond the ends of the box as shown in Figures 8 and 9, providing right and left indicating members. A pivotally mounted stop arm 9 is arranged on the box 5 and positioned to move to a vertical position, shown in Figure 10, when the automobile is brought to a stop and back to a horizontal position out of the way, as shown in Figure 2, when the brake has been released. In order to move the arm 9 a bell crank lever 10 is provided connected to an extension 9' on arm 9 through the use of a link 11. A pull rod 12 is pivotally connected to one arm of the bell crank lever and slidingly connected to the brake pedal 2. This sliding connection is preferably in the way of an elongated opening 13 through which a pin 14 projects whereby the brake lever 2 may be moved for a short distance before the rod 12 is moved. The slot 13 is, however, sufficiently short and the parts are properly proportioned to cause arm 9 to move to a vertical position when the brake has been fully applied. In order to slide the member 8 a link 15 is connected therewith and with one leg of the bell crank lever 16, which bell crank lever is connected to a pull and push rod 17 by a suitable pivotal pin. Rod 17 is pivotally connected at 18 to a specially prepared lever 19 journaled at 20 in a suitable bracket connected with the body of the automobile. When the lever 19 is pulled to the rear the left end of the arm 8 will be moved outwardly as shown in Figure 9, and when the lever is pushed forward to a vertical position the right end will be moved out as shown in Figure 8, thus indicating a right and left turning. It will be noted that the stop arm 9 is operated automatically when the brake pedal is operated, while the right and left signal arms are operated by a special lever 19.

These arms are ample during the day time for indicating the proposed action of the driver, but at night these arms cannot be readily seen so that a signal arrangement is provided as indicated particularly in Figures 3 to 7 inclusive. The box 5 is divided into compartments 21, 22 and 23 by the partition walls 24 and 25, and in each compartment is provided the respective lamps 26, 27 and 28. The rear of the box or casing 5 is cut out so as to provide arrows 29 and 30 and a central round opening 31. In order to show these special cut out openings plates of glass 32, 33 and 34 are provided back of the openings, said glass plates being of any desired color, as for instance yellow, though if desired they could be made some other color, especially the central glass 33 might be made red. However, it is desirable to make the colors something beside red in order to produce a light which can be distinguishable from the usual red tail light. It will be, of course, noted that when any of the lamps 26, 27 or 28 are lighted the corresponding arrow will be disclosed by a proper illumination thereof so as to indicate turning to the right, left, or stopping. In order that these lamps may be lighted at the proper time and without any appreciable trouble to the driver, an arrangement of circuits is provided as shown in Figure 3. Ordinary cut out switches 35 and 40 are provided for cutting out the current in the day time, or in fact at any time. The switch 35 is connected at one end to the brake pedal 2 and at the opposite end to a source of current 36, which source is also connected to the lamp 27, said lamp having a return wire 37 which is connected with a contact 38 adapted to be engaged by the pedal 2 when moved a short distance. Preferably this contact is resilient and will give when pressure is brought to bear thereon by the pedal 2, whereby the pedal is permitted a free movement for applying the brakes and a contact for the central light provided. In order to provide current for the lamps 26 and 28 a source of current 39 is provided, which is connected to the lever 19, a suitable switch 40 being interposed in the connection. The return wires 41 and 42 from the lamps 26 and 28 are connected to the contacts 43 and 44 respectively so as to be engaged at different times by the lever 19, which when so engaged completes the circuit of the particular lamp. This contact surface may be resilient or rigid if desired. Lever 19 is operated in the day time exactly as it is operated in the night and the signal arm or slide 8 may be operated both day and night, but the lamps 26 and 28 will be only lighted in the night as the switch 40 will normally be kept open during the day.

What I claim is:

1. A rear signal for automobiles comprising a covering member at the rear, a pair of guideways mounted on said covering member, a sliding plate arranged in said guideways formed to act as a double pointer, a swinging arm connected with said guideways, said slide plate and said arm being normally hid by said covering member, means connecting said swinging arm with the brake pedal of the automobile so that when the brake pedal has been applied the arm will be moved to an exposed position for indicating stopping of the automobile, a pivotally mounted lever arranged at the front of the automobile adjacent the brake pedal, and means connecting said lever with said sliding member for shifting the same so that either end will project beyond the covering member and indicate turning to the right or left according to the movement of the plate.

2. A rear signal for automobiles comprising a covering member, a slideway mounted on said covering member, a sliding plate arranged in said slideway, a link connected with said plate, a bell crank lever connected with said link, a rod for moving said bell crank lever, and an actuating lever at the front of the automobile for shifting the position of said rod whereby said plate is moved to the right and left so as to project beyond said covering member and indicate a turning to the right and left according to the position of the plate.

3. A signal device for automobiles, comprising a covering member, a visual signal member slidably mounted upon said covering member and provided with end portions extending in opposite directions and serving as pointers for indicating right and left directions, said visual signal member having a predetermined normal position in which it is hidden by said covering member, a swinging arm for indicating stoppage of the vehicle, mechanism connecting the swinging arm with the brake pedal of the automobile so that the operation of the brake pedal will actuate said swinging arm, and a manually operated lever connected with said visual signal member for the purpose of sliding the same in order to render visible at the will of the operator, either of said end portions of said visual member serving as pointers.

ARTHUR DAVIS.